United States Patent [19]

Narayana et al.

[11] Patent Number: 5,955,897
[45] Date of Patent: *Sep. 21, 1999

[54] SIGNAL GENERATION DECODER CIRCUIT AND METHOD

[75] Inventors: Pidugu L. Narayana; Andrew L. Hawkins, both of Starkville, Miss.

[73] Assignee: Cypress Semiconductor Corp., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/897,773

[22] Filed: Jul. 21, 1997

Related U.S. Application Data

[63] Continuation of application No. 08/615,718, Mar. 13, 1996, Pat. No. 5,661,418.

[51] Int. Cl.[6] .................................................. H03K 19/00
[52] U.S. Cl. ............................ 326/105; 326/93; 365/221
[58] Field of Search ................................... 326/104–105, 326/93; 365/189.01, 221, 230.06

[56] References Cited

U.S. PATENT DOCUMENTS

| | | | |
|---|---|---|---|
| 4,467,443 | 8/1984 | Shima | 395/416 |
| 4,802,122 | 1/1989 | Auvinen et al. | 365/154 |
| 4,833,651 | 5/1989 | Seltzer et al. | 365/189.07 |
| 4,839,866 | 6/1989 | Ward et al. | 365/221 |
| 4,847,812 | 7/1989 | Lodhi | 365/221 |
| 4,864,543 | 9/1989 | Ward et al. | 365/221 |
| 4,875,196 | 10/1989 | Spaderna et al. | 365/238 |
| 4,888,739 | 12/1989 | Frederick et al. | 365/211 |

(List continued on next page.)

FOREIGN PATENT DOCUMENTS

| 1113996 | 5/1989 | Japan . |
|---|---|---|
| 676559 | 3/1994 | Japan . |

OTHER PUBLICATIONS

Andrew Hawkins et al., U.S.S.N. 08/577,712 Circuit For Generating Almost Full And Almost Empty Flags In Asynchronous And Synchronous FIFOS, filed Dec. 22, 1995.

Andrew Hawkins et al., U.S.S.N. 08/578,209 Programmable Read–Write Word Line Equality Signal Generation For FIFOS, filed Dec. 29, 1995.

Andrew Hawkins et al., U.S.S.N. 08/567,918 State Machine Design For Generating Half–Full And Half–Empty Flags In An Asynchronous FIFO, filed Dec. 6, 1996.

T. Ishii et al., High–Speed, High–Drive SN74ABT7819 FIFO, Mar., pp. 1–3, 5–12.

P. Forstner, FIFOs With a Word Width of One Bit, First–In, First–Out Technology, Mar., 1996, 1–24.

T. Jackson, FIFO Memories: Solution to Reduce FIFO Mestastability, First–In, First–Out Technology, Mar. 1996, pp. 1–6.

(List continued on next page.)

*Primary Examiner*—Jon Santamauro
*Attorney, Agent, or Firm*—Christopher P. Maiorana; Maiorana & Acosta, P.C.

[57] ABSTRACT

The present invention provides a circuit and method for manipulating the least significant bit (LSB) of the read and write count signal to generate a glitch free mutually non-exclusive decoder output. The present invention can be used to generate a logic to eliminate glitches in the inputs to a full/empty flag generator, an almost full/almost empty flag generator or a half-full/half-empty flag generator. The circuit can be extended to generate the logic to eliminate glitches in either direction as the count signals move across a boundary change in a half-full flag generation circuit.

23 Claims, 2 Drawing Sheets

U.S. PATENT DOCUMENTS

| | | | |
|---|---|---|---|
| 4,891,788 | 1/1990 | Kreifels | 365/49 |
| 4,942,553 | 7/1990 | Dalrymple et al. | 364/900 |
| 4,985,867 | 1/1991 | Ishii et al. | 365/221 |
| 5,021,994 | 6/1991 | Tai et al. | 364/900 |
| 5,079,693 | 1/1992 | Miller | 395/250 |
| 5,084,837 | 1/1992 | Matsumoto et al. | 395/250 |
| 5,088,061 | 2/1992 | Golnabi et al. | 365/189.01 |
| 5,121,346 | 6/1992 | McClure | 364/550 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 365/221 |
| 5,265,063 | 11/1993 | Kogure | 365/233 |
| 5,274,600 | 12/1993 | Ward et al. | 365/221 |
| 5,278,956 | 1/1994 | Thomsen et al. | 395/250 |
| 5,305,253 | 4/1994 | Ward | 365/73 |
| 5,311,475 | 5/1994 | Huang | 365/221 |
| 5,315,184 | 5/1994 | Benhamida . | |
| 5,317,756 | 5/1994 | Komatsu et al. | 395/800 |
| 5,325,487 | 6/1994 | Au et al. | 395/250 |
| 5,336,938 | 8/1994 | Sywyk | 307/265 |
| 5,345,419 | 9/1994 | Fenstermaker et al. | 365/189.04 |
| 5,365,485 | 11/1994 | Ward et al. | 365/221 |
| 5,367,486 | 11/1994 | Mori et al. | 365/188.05 |
| 5,375,092 | 12/1994 | Taniguchi et al. | 365/221 |
| 5,381,126 | 1/1995 | McClure | 340/146.2 |
| 5,384,744 | 1/1995 | Lee | 365/221 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,471,583 | 11/1995 | Au et al. | 395/250 |
| 5,473,756 | 12/1995 | Traylor | 395/250 |
| 5,487,049 | 1/1996 | Hang | 365/221 |
| 5,490,257 | 2/1996 | Hoberman et al. | 395/427 |
| 5,495,451 | 2/1996 | Cho | 365/221 |
| 5,502,655 | 3/1996 | McClure | 364/550 |
| 5,506,809 | 4/1996 | Csoppenszky et al. | 365/221 |
| 5,506,815 | 4/1996 | Hsieh et al. | 365/230.03 |
| 5,508,679 | 4/1996 | McClure | 340/146.2 |
| 5,513,318 | 4/1996 | van de Goor et al. | 395/185.01 |
| 5,515,330 | 5/1996 | Hattori et al. | 365/221 |
| 5,519,701 | 5/1996 | Colmant et al. | 370/60.1 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,557,575 | 9/1996 | Lee | 365/221 |
| 5,587,962 | 12/1996 | Hashimoto et al. | 365/230.09 |
| 5,619,681 | 4/1997 | Benhamida et al. | 395/500 |
| 5,623,449 | 4/1997 | Fischer et al. | 315/200 |
| 5,625,842 | 4/1997 | Dalrymple | 395/842 |
| 5,627,797 | 5/1997 | Hawkins et al. | 365/221 |
| 5,636,176 | 6/1997 | Hashimoto et al. | 365/233 |
| 5,642,318 | 6/1997 | Knaack et al. | 365/201 |
| 5,661,418 | 8/1997 | Narayana et al. | 326/105 |

OTHER PUBLICATIONS

T. Jackson, Advanced Bus–Matching/Byte–Swapping Features for Internetworking FIFO Applications, Mar. 1996, pp. 1–3, 5–12.

T. Jackson, Parity–Generate and Parity–Check Features for High–Bandwidth–Computing FIFO Applications, Mar. 1996, pp. 1–3, 5–8.

K. Kittrell, 1Kx9X2 Asynchronous FIFOs SN74ACT2235 and SN74ACT2236, Sep. 1995, 1–3, 5–9.

Andrew Hawkins et al., U.S.S.N. 08/567,893 State Machine Design For Generating Empty And Full Flags In An Asynchronous FIFO, filed Dec. 6, 1995.

Pidugu Narayana et al., U.S.S.N. 08/666,751 Half–Full Flag Generator For Synchronous FIFOS, filed Aug. 2, 1996.

C. Wellheuser et al., Internetworking the SN74ABT3614, Mar. 1996, pp. 1–21.

C. Wellheuser, Metastability Performance of Clocked FIFOs, 1996, pp. 1–3, 5–12.

High Speed CMOS 256x36x2 Bi–direction FIFO, QS725420A, MDSF–00018–01, Apr. 24, 1995, pp. 1–36.

High–Speed CMOS 4Kx9 Clocked FIFO with Output Enable, QS7244 A, MDSF–00008–05, Jun. 6, 1995, pp. 1–12.

High–Speed CMOS 1K X 36 Clocked FIFO with Bus Sizing, QS723620, MDSF–00020–00, Jul. 17, 1995, pp. 1–36.

SIGNAL GENERATION DECODER CIRCUIT AND METHOD

This is a continuation of U.S. patent application Ser. No. 08/615,718, filed Mar. 13, 1996 U.S. Pat. No. 5,661,418.

FIELD OF THE INVENTION

The invention relates to FIFO buffers generally and, more particularly, to a signal generation decoder for generating inputs to be used with a state machine or other device that generates status flags.

BACKGROUND OF THE INVENTION

A first-in first-out (FIFO) buffer uses counters, adders and combinatorial logic to generate a half empty and/or a half full flag. FIFOs can also generate programmable empty and programmable full flags having a user programmed offset ahead of the respective boundary flags. The programmable empty and programmable full flags are generated by computing the difference between the write and read counters and comparing this magnitude with the user programmed offset. The read and write counters arc reset to zero upon master reset.

A copending application, Ser. No. 08/572,623, provides a state machine design which can be used to realize extremely short delays in generating half-full and half-empty flags and is hereby incorporated by reference in its entirety. The copending application generates a set of next state variables from a combination of three previous state variables and three additional inputs representing a logical OR of a read half-full and write half-full flag, an external write clock input and an external read clock input.

The inputs to the state machine (used to generate the status flags) are derived using an internal half-full decode logic having variations of the read and write clocks as inputs. The output of the decoder that is fed to the state machine inputs may have glitches. Glitches are generally defined as a transient state where a signal, in this case the output of the decoder, fluctuates between digital states (i.e., a digital one and a digital zero). The width (i.e., the length of time in the transient state) of the glitches is a function of the current read and write counter values. The state machine can be designed to handle these glitches internally at the expense of having an increased complexity.

Previous approaches to minimize the width of a glitch produced by a decoder circuit generally include sizing down the NMOS devices in the NOR gates as well as the PMOS devices in the NAND gates and adding a delay to allow the circuit to settle into a glitch-free steady state value Essentially, the NOR and NAND gates delay producing an output until the glitch has passed. The disadvantage of such an approach is that the delay which is necessary to improve the function (by reducing glitches) slows down the circuit.

Other methods to reduce glitches are to employ edge preferential delays to use, to use non-overlapping clock generators or to add magnitude comparators. However, each of these methods slows down the overall performance of the underlying flag generation circuit.

SUMMARY OF THE INVENTION

The present invention provides a circuit for manipulating the least significant bit (LSB) of a read and write count signal to generate a glitch free mutually non-exclusive decoder output. The present invention can be used to generate logic to eliminate glitches in the signals presented to a full/empty flag, generator, an almost full/almost empty flag generator or a half-full/half-empty flag generator. The circuit can be extended to generate the logic to eliminate glitches in either direction as the count signals move across a boundary change in a half-full flag generation circuit.

The objects, features and advantages of the present invention include providing a decoder circuit for presenting a glitch free, mutually non-exclusive output to be used by a flag generator that eliminates glitches in either direction across a boundary in a half-full flag generation system. The decoder circuit does not introduce significant additional delays while waiting for the circuit to stabilize. Additionally, the decoder advantageously eliminates glitches completely without affecting the timing of the circuit. The decoder circuit does not require simulations and does not impose a chip real estate penalty.

BRIEF DESCRIPTION OF THE DRAWINGS

These and other objects, features and advantages of the present invention will be apparent from the following detailed description and the appended claims in which:

DETAILED DESCRIPTION OF THE PREFERRED EMBODIMENTS

Figure 1:
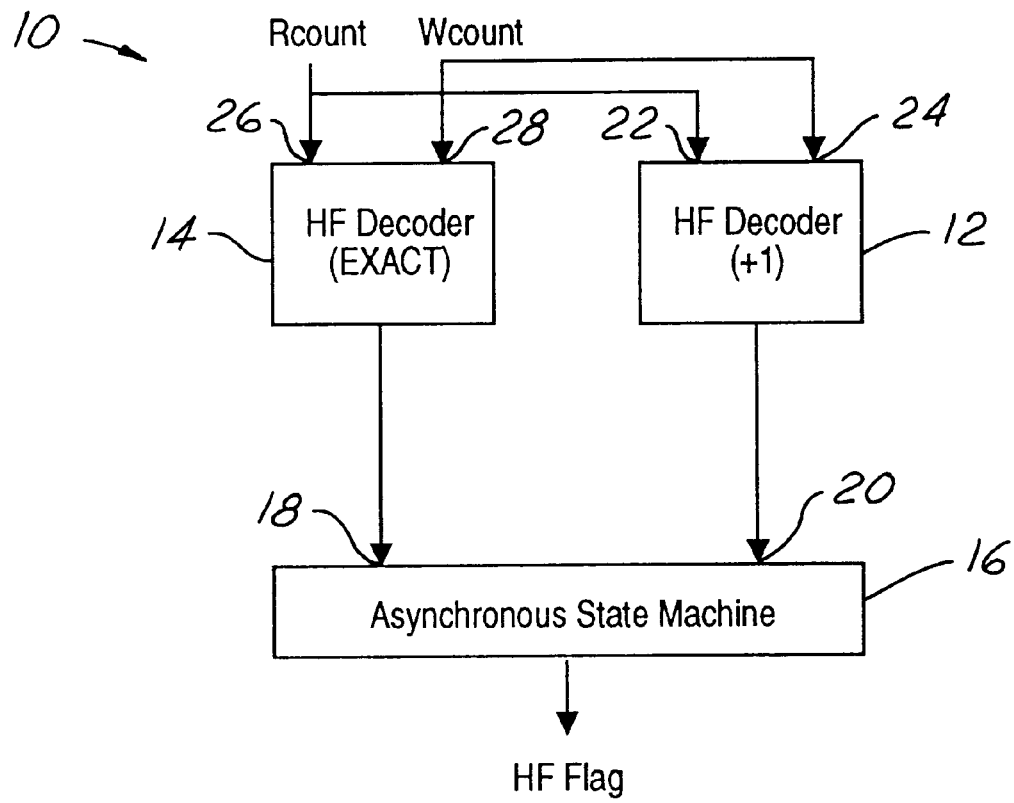
FIG. 1 is a block diagram of a preferred embodiment of the present invention shown creating the inputs for a half-full flag generating asynchronous state machine.

Referring to FIG. 1, a block diagram illustrating a circuit 10 is shown in accordance with a preferred embodiment of the present invention. The circuit 10 generally comprises a half-full decoder 12, a half-full decoder 14 and an asynchronous state machine 16. The state machine 16 receives a first input 18 and a second input 20. The state machine 16 is shown in accordance with the copending incorporated application referenced above. The half-full decoder 12 has a first input 22 that receives a read count signal Rcount and a second input 24 that receives a write count Wcount. Similarly, the half-full decoder 14 has a first input 26 that receives the read count signal Rcount and a second input 28 that receives the write count signal Wcount.

The half-full decoder 12 is a +1 decoder since it receives the +1 sub-count signal from the read count signal Rcount and the write exact sub-count signal from the write count signal Wcount. Specifically, the read count signal Rcount and the write count signal Wcount are both synchronous count signals that have four built-in sub-count signals (to be described in greater detail with respect to FIG. 2). The half-full decoder 14 is an exact decoder since it receives exact sub-count signals from the read count signal Rcount and the write count signal Wcount.

Figure 2:
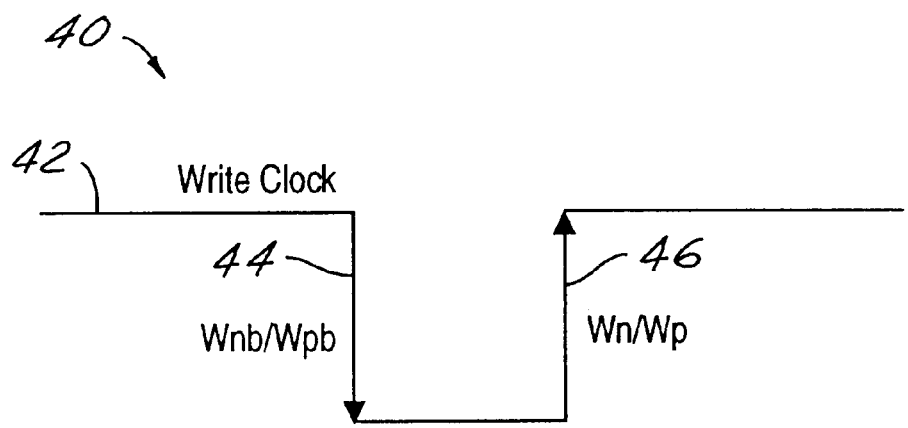
FIG. 2 is a timing diagram illustrating the four sub-count signals derived from each of the read and write synchronous signals.

Referring to FIG. 2, a write count signal 40 is shown graphically illustrating the four individual sub-count signals. The write count signal 40 generally comprises a write clock signal 42 that has a falling edge 44 and a rising edge 46. A signal Wnb and a signal Wpb are triggered by the falling edge 44. A signal Wn and a signal Wp are triggered by the rising edge 46. The signal Wn and the signal Wnb are the +1 sub-count signals and the signal Wp and the signal Wpb are the exact sub-count signals. As a result, four individual sub-count signals Wnb, Wpb, Wn and Wp are created that each having specific functional characteristics needed in circuit design, specifically with regards to FIG. 3. The read count signal Recount has four similar built-in sub-count signals.

Figure 3:
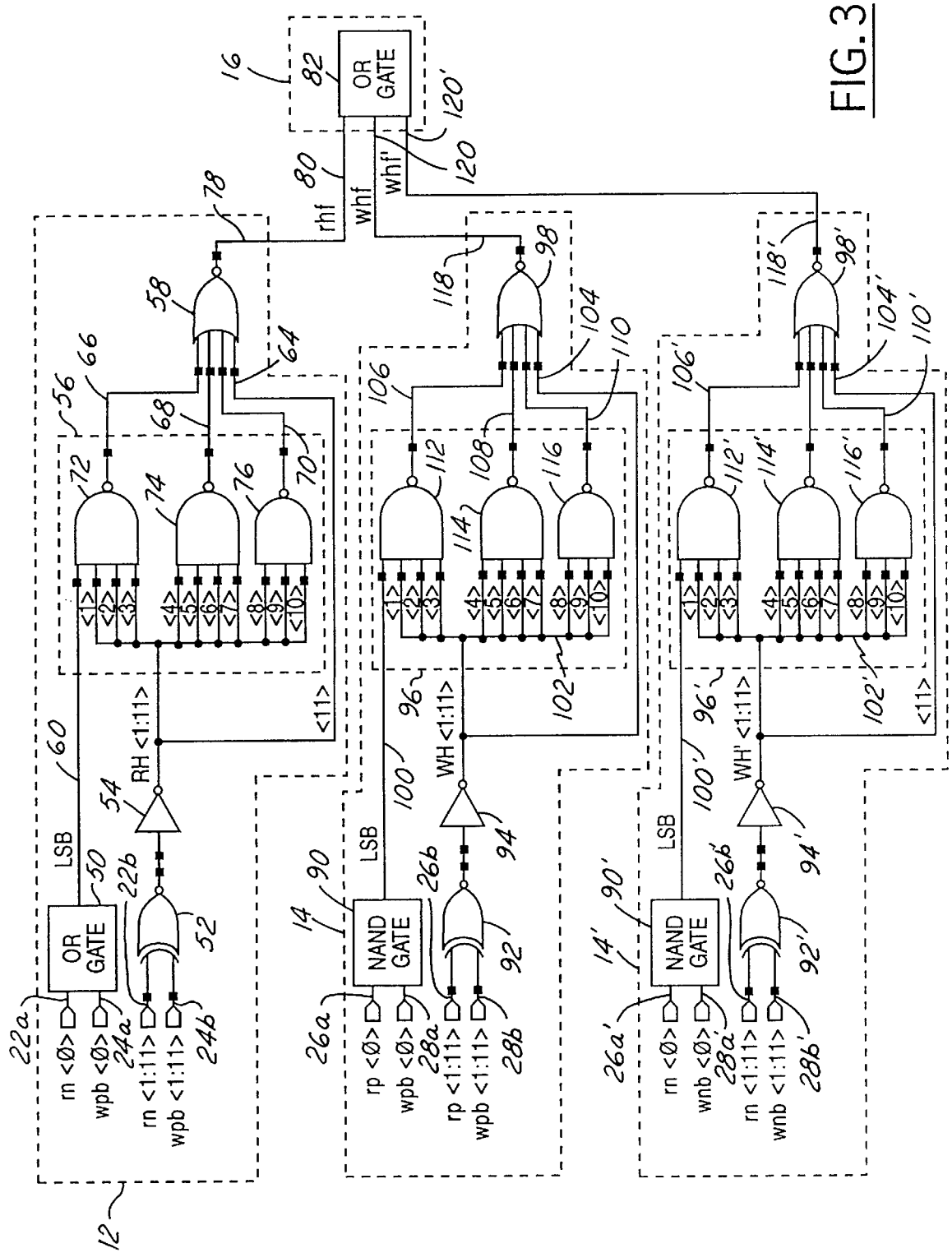
FIG. 3 is a circuit diagram of a preferred embodiment of the present invention.

Referring to FIG. 3, a circuit diagram of the half-full decoder 12, the half-full decoder 14 and the half-full decoder 14' is shown. FIG. 3 is an example of the present invention tailored to produce inputs for a half-full/half-empty flag generating state machine. Inputs for a full/empty or almost full/almost empty flag generating state machine can be generated as well. The half-full decoder 12 generally comprises an OR gate 50, an exclusive NOR (XNOR) gate 52, an inverter 54, a NAND section 56 and a NOR gate 58. The OR gate 50 receives a signal from an input 22a that receives the read +1 sub-count signal Rn and a signal from an input 24a that receives the write exact sub-count signal Wpb. The OR gate 50 presents a signal to a LSB (Least Significant Bit) input 60 of the NAND section 56. The signal present at the input 22a represents a LSB of the read +1 sub-count signal Rn. The signal at the input 24a represents a LSB of the write exact sub-count signal Wpb. The OR gate 50 presents a signal that is at a digital high state (for a positive polarity logic) when either the input 22a or the input 24a is high.

The XNOR gate 52 receives a signal from the input 22b and a signal from the input 24b. The input 22b is a multi-bit input representing 11 bits of the read +1 sub-count signal Rn. The input 24 is a multi-bit input that receives 11 bits from the write exact sub-count signal Wpb. The XNOR gate 52 and the inverter. 54 work in combination to produce the effect of a XOR gate having an output that is presented to an input 62 of the NAND section 56 as well as to an input 64 of the NOR gate 58. The NAND section 56 presents an output 66, an output 68 and an output 70 that are each received by the NOR gate 58.

The NAND section 56 comprises a NAND gate 72, a NAND gate 74 and a NAND gate 76. The NAND gate 72 receives a signal from the LSB input 60 as well as signals representing the first, second and third bits of the signal received at a multi-bit input 62. The NAND gate 74 receives the fourth, fifth, sixth and seventh bits of the signal received at the multi-bit input 62. The NAND gate 76 receives the eight, ninth and tenth bits of the signal received at the multi-bit input 62. The NAND section, in combination with the OR gate 50, the XOR gate 52, the inverter 54 and the NOR gate 58, provides a signal presented to an output 78 that represents a read half-full signal RHF. The signal REF is presented to an input 80 of an OR gate 82. The input 80 generally corresponds to the input 20 of FIG. 1.

The half-full decoder 14 generally comprises a NAND gate 90, a XNOR gate 92, an inverter 94, a NAND section 96 and a NOR gate 98. The OR gate 90 receives a signal from an input 26a that receives the read exact sub-count signal Rp and a signal from an input 28a that receives the write exact sub-count signal Wpb. The OR gate 90 presents a signal to a LSB input 100 of the NAND section 96. The signal present at the input 26a represents the least significant bit of the read exact sub-count signal Rp. The signal at the input 28a represents the least significant bit of the write exact sub-count signal Wpb. The OR gate 90 presents a signal that is at a digital high state when either the input 26a or the input 28a is high.

The XNOR gate 92 receives a signal from the input 26b and a signal from the input 28b. The input 26b is a multi-bit input representing 11 bits of the read exact sub-count signal Rp. The input 28b is a multi-bit input that receives 11 bits from the write exact sub-count signal Wpb. The XNOR gate 92 and the inverter 94 work in combination to produce the effect of a XOR gate having an output that is presented to an input 102 of the NAND section 96 as well as to an input 104 of the NOR gate 98. The NAND section 96 presents an output 106, an output 108 and an output 110 that are each received by the NOR gate 98.

The NAND section 96 comprises a NAND gate 112, a NAND gate 114 and a NAND gate 116. The NAND gate 112 receives a signal from the LSB input 100 as well as signals representing the first, second and third bits of the signal received at a multi-bit input 102. The NAND gate 114 receives the fourth, fifth, sixth and seventh bits of the signal received at the multi-bit input 102. The NAND gate 116 receives the eighth, ninth and tenth bits of the signal received at the multi-bit input 102. The NAND section, in combination with the OR gate 90, the XOR gate 92, the inverter 94 and the NOR gate 99, provide a signal presented to an output 118 that represents a write half-full signal WHF. The signal WHF is presented to an input 120 of the OR gate 82. The input 120 generally corresponds to the input 18 of FIG. 1.

The half-full decoder 14' generally comprises similar logic components as the half-full decoder 14. The individual components of the half-full decoder 14' are indicated by using primed reference numerals that correspond to the reference numerals used in the description of the half-full decoder 14. The XNOR gate 92' receives a signal from the input 26b' and a signal from the input 28b'. The input 26b' is a multi-bit input representing 11 bits of the read +1 sub-count signal Rn. The input 28b' is a multi-bit input that receives 11 bits from the write +1 sub-count signal Wnb. The half-full decoder 14' provides a signal to the output 118' which represents a write half-full signal WHF'. The signal WHF' is presented to an input 120' of the OR gate 82.

The half-full decoder 14 in combination with the half-full decoder 12 produce a filtering effect of the signal RHF and the signal WHF that are each presented to the state machine 16, The OR gate 82 is a device internal to the state machine 16 that receives the signal WHF and the signal RHF. As a result, glitches are filtered out in a positive direction (i.e., from a less than half-full state to a more than half-full state). To filter out glitches in a negative direction (i e., from a more than half-full state to a less than half-full state), the half-full decoder 14' is generally required. The half-full decoder 14' provides the write half-full signal WHF' that functions in combination with the signal WHF and the signal RHF to eliminate glitches in the negative direction across the boundary. If any of the signals WHF, WHF' or RHF are at a digital high state, the output of the OR gate 82 will be a digital high.

If glitches are only required to be eliminated in the positive direction, the implementation of the half-full decoder 12 and the half-full decoder 14 will generally be required. If glitches are required to be eliminated in both the positive and the negative directions across the half-full boundary, the implementation of the half-full decoder 12, the half-full decoder 14 and the half-full decoder 14' will generally be required.

TABLE 1 illustrates a graphical representation of the write half-full signal WHF, the write half-full signal WHF' and the read half-full signal RHF as compared to the write-pointer and the read-pointer during a transition in a positive direction.

TABLE 1

|  | write-pointer | read-pointer | RHF | WHF | WHF' | OR |
|---|---|---|---|---|---|---|
| 1 | 0 | 0 | 0 | 0 | 0 | 0 |
| 2 | 1 | 0 | 0 | 0 | 0 | 0 |
| 3 | 2 | 0 | 1 | 1 | 1 | 1 |
| 4 | 3 | 0 | 1 ↓ | 1 ↓ | 0 | 1 |
| 5 | 4 | 0 | 0 | 0 | 0 | 0 |
| 6 | 1 | 1 | 0 | 0 | 0 | 0 |
| 7 | 2 | 1 | 0 | 0 | 0 | 0 |
| 8 | 3 | 1 | 0 | 1 | 1 | 1 |
| 9 | 4 | 1 | 1 | 0 | 1 ↓ | 1 |
| 10 | 5 | 1 | 0 | 0 | 0 | 0 |
| 11 | 2 | 2 | 0 | 0 | 0 | 0 |
| 12 | 3 | 2 | 0 | 0 | 0 | 0 |
| 13 | 4 | 2 | 1 | 1 | 1 | 1 |
| 14 | 5 | 2 | 1 ↓ | 1 ↓ | 0 | 1 |
| 15 | 6 | 2 | 0 | 0 | 0 | 0 |
| 16 | 3 | 3 | 0 | 0 | 0 | 0 |
| 17 | 4 | 3 | 0 | 0 | 0 | 0 |
| 18 | 5 | 3 | 0 | 1 | 1 | 1 |
| 19 | 6 | 3 | 1 | 0 | 1 ↓ | 1 |
| 20 | 7 | 3 | 0 | 0 | 0 | 0 |
| 21 | 4 | 4 | 0 | 0 | 0 | 0 |
| 22 | 5 | 4 | 0 | 0 | 0 | 0 |
| 23 | 6 | 4 | 1 | 1 | 1 | 1 |
| 24 | 7 | 4 | 1 ↓ | 1 ↓ | 0 | 1 |
| 25 | 0 | 4 | 0 | 0 | 0 | 0 |
| 26 | 5 | 5 | 0 | 0 | 0 | 0 |
| 27 | 6 | 5 | 0 | 0 | 0 | 0 |
| 28 | 7 | 5 | 0 | 1 | 1 | 1 |
| 29 | 0 | 5 | 1 | 0 | 1 ↓ | 1 |
| 30 | 1 | 5 | 0 | 0 | 0 | 0 |
| 31 | 6 | 6 | 0 | 0 | 0 | 0 |
| 32 | 7 | 6 | 0 | 0 | 0 | 0 |
| 33 | 0 | 6 | 1 | 1 | 1 | 1 |
| 34 | 1 | 6 | 1 ↓ | 1 ↓ | 0 | 1 |
| 35 | 2 | 6 | 0 | 0 | 0 | 0 |
| 36 | 7 | 7 | 0 | 0 | 0 | 0 |
| 37 | 0 | 7 | 0 | 0 | 0 | 0 |
| 38 | 1 | 7 | 0 | 1 | 1 | 1 |
| 39 | 2 | 7 | 1 | 0 | 1 ↓ | 1 |
| 40 | 3 | 7 | 0 | 0 | 0 | 0 |

When the write-pointer switches between 3 and 4 (indicated by the column numbers 8 and 9) while the read-pointer remains at 1, the read half-full signal RHF switches from 0 to 1 while the write half-full signal WHF switches from 1 to 0. The opposite transition of the read half-full signal RHF and the write half-full signal WHF may create a potential glitch. As a result, the write half-full signal WHF' remains 1 which forces the output of the OR gate 82 to remain a 1.

TABLE 2 illustrates a graphical representation of the write half-full signal WHF, the write half-full signal WHF' and the read half-full signal RHF as compared to the write-pointer and the read-pointer during a transition in a negative direction.

TABLE 2

|  | write-pointer | read-pointer | RHF | WHF | WHF' | OR |
|---|---|---|---|---|---|---|
| 1 | 0 | 0 | 0 | 0 | 0 | 0 |
| 2 | 4 | 0 | 0 | 0 | 0 | 0 |
| 3 | 5 | 0 | 1 | 0 | 1 | 1 |
| 4 | 6 | 0 | 1 ↓ | 1 | 1 ↓ | 1 |
| 5 | 7 | 0 | 0 | 0 | 0 | 0 |
| 6 | 0 | 1 | 0 | 0 | 0 | 0 |
| 7 | 1 | 1 | 0 | 0 | 0 | 0 |
| 8 | 5 | 1 | 0 | 0 | 0 | 0 |
| 9 | 6 | 1 | 1 | 1 | 0 | 1 |
| 10 | 7 | 1 | 0 | 1 ↓ | 1 | 1 |
| 11 | 0 | 2 | 1 ↑ | 1 | 1 | 1 |
| 12 | 1 | 2 | 0 | 0 | 0 | 0 |
| 13 | 2 | 2 | 0 | 0 | 0 | 0 |
| 14 | 6 | 2 | 0 | 0 | 0 | 0 |
| 15 | 7 | 2 | 1 | 0 | 1 | 1 |
| 16 | 0 | 3 | 1 | 1 | 0 | 1 |
| 17 | 1 | 3 | 0 | 1 ↓ | 1 | 1 |
| 18 | 2 | 3 | 0 | 0 | 0 | 0 |
| 19 | 3 | 3 | 0 | 0 | 0 | 0 |
| 20 | 7 | 3 | 0 | 0 | 0 | 0 |
| 21 | 0 | 4 | 0 | 0 | 0 | 0 |
| 22 | 1 | 4 | 1 | 0 | 1 | 1 |
| 23 | 2 | 4 | 1 ↓ | 1 | 1 ↓ | 1 |
| 24 | 3 | 4 | 0 | 0 | 0 | 0 |
| 25 | 4 | 4 | 0 | 0 | 0 | 0 |
| 26 | 1 | 5 | 0 | 0 | 0 | 0 |
| 27 | 2 | 5 | 1 | 1 | 0 | 1 |
| 28 | 3 | 5 | 0 | 1 ↓ | 1 | 1 |
| 29 | 4 | 5 | 0 | 0 | 0 | 0 |
| 30 | 5 | 5 | 0 | 0 | 0 | 0 |
| 31 | 2 | 6 | 0 | 0 | 0 | 0 |
| 32 | 3 | 6 | 1 | 0 | 1 | 1 |
| 33 | 4 | 6 | 1 ↓ | 1 | 1 ↓ | 1 |
| 34 | 5 | 6 | 0 | 0 | 0 | 0 |
| 35 | 6 | 6 | 0 | 0 | 0 | 0 |
| 36 | 3 | 7 | 0 | 0 | 0 | 0 |
| 37 | 4 | 7 | 1 | 1 | 0 | 1 |
| 38 | 5 | 7 | 0 | 1 ↓ | 1 | 1 |
| 39 | 6 | 7 | 0 | 0 | 0 | 0 |
| 40 | 7 | 7 | 0 | 0 | 0 | 0 |

When the read-pointer switches between 7 and 0 (indicated by the column numbers 10 and 11) while the write-pointer remains at 1, the read half-full signal RHF switches from 0 to 1 while the write half-full signal WHF remains at 1. The transition desired may create a potential glitch. As a result, the write half-full signal WHF' remains 1 which forces the output of the OR gate 82 to remain a 1.

While the invention has been particularly shown and described with reference to the preferred embodiments thereof, it will be understood by those skilled in the art that various changes in form and details may be made without departing from the spirit and scope of the invention.

We claim:

1. A circuit for decoding read and write signals in a memory, said circuit comprising:
    a first decoder receiving a first read counter and a first write counter, said first decoder providing a first decoded signal; and
    a second decoder receiving a second read counter and a second write counter, said second decoder providing a second decoded signal, wherein (i) said second read counter is the same as said first read counter and said second write counter is different from said first write counter or (ii) said second write counter is the same as said first write counter and said second read counter is different from said first read counter.

2. The circuit according to claim 1 further comprising a status flag generating circuit that generates said status flag in response to said first and second decoded signals.

3. The circuit according to claim 2 wherein said one or more status flags indicate when certain predefined criteria are met.

4. The circuit according to claim 1 wherein said memory comprises a FIFO buffer.

5. The circuit according to claim 1 wherein said first and second decoded signals are generated without glitches prior to settling into a steady state.

6. The circuit according to claim 1 wherein said first and second decoded signals are generated without significant additional delays.

7. The circuit according to claim 1 wherein said first decoder further comprises:
   a first logic circuit configured to receive said first read counter and said first write counter as a multi-bit signal and provide a first processed signal, said first logic circuit does not receive a least significant bit (LSB) of said first read and write counters;
   a second logic circuit configured to receive said LSB of said first read counter and said first write counter, said second logic circuit generating a second processed signal; and
   a first gate circuit configured to receive said first and second processed signals from said first and second logic circuits, said first gate circuit generating a single-bit signal representing said first decoded signal.

8. The circuit according to claim 7 wherein said second decoder circuit further comprises:
   a third logic circuit configured to (i) receive said second read counter and said second write counter as a multi-bit signal and (ii) generate a third processed signal, said third logic circuit does not receive a (LSB) of said second read and write counters;
   a fourth logic circuit configured to receive said LSB of said second read counter and said second write counter, said fourth logic circuit generating a fourth processed signal; and
   a second gate circuit configured to receive said third and fourth processed signals from said third and fourth logic circuits, said second gate circuit generating a single-bit signal representing said second decoded signal.

9. The circuit according to claim 7 wherein said first gate circuit comprises:
   a plurality of NAND gates each generating an output and each receiving one or more of said bits of said first processed signal, one of said plurality of NAND gates receives said LSB signal; and
   a third gate circuit configured to receive each of said outputs from said plurality of NAND gates, said third gate circuit generating said first decoded signal.

10. The circuit according to claim 8 wherein said second gate circuit comprises:
    a plurality of NAND gates each generating an output and each receiving one or more of said bits of said fourth processed signal, one of said plurality of NAND gates receives said LSB signal; and
    a fourth gate circuit configured to receive each of said outputs from said plurality of NAND gates, said fourth gate circuit generating said second decoded signal.

11. The circuit according to claim 1 further comprising a third decoder receiving a third read counter and a third write counter, said third decoder circuit generating a third decoded signal, wherein said third read counter is the same as or different from said first and second read counters and said third write counter is the same as or different from said first and second write counters.

12. The circuit according to claim 11 wherein said third decoder circuit further comprises:
    a fifth logic circuit configured to receive said third read counter and said third write counter as a multi-bit signal and generating a fifth processed signal, said fifth logic circuit does not receive a least significant bit (LSB) of said third read and write counters;
    a sixth logic circuit configured to receive said LSB of said third read counter and said third write counter, said sixth logic circuit generating a sixth processed signal; and
    a fifth gate circuit configured to receive said fifth and sixth processed signals from said fifth and sixth logic circuits, said fifth gate circuit generating a single-bit signal representing said third decoded signal.

13. The circuit according to claim 12 wherein said fifth gate circuit comprises:
    a plurality of NAND gates each generating an output and each receiving one or more of said bits of said sixth processed signal, one of said plurality of NAND gates receives said LSB signal; and
    a sixth gate circuit configured to receive each of said outputs from said plurality of NAND gates, said sixth gate circuit generating said third decoded signal.

14. A circuit for decoding read and write signals, said circuit comprising:
    a first decoder receiving a first read counter and a first write counter, said first decoder providing a first decoded signal;
    a second decoder receiving a second read counter and a second write counter, said second decoder providing a second decoded signal; and
    a third decoder receiving said first read counter and said second write counter, said third decoder providing a third decoded signal wherein (i) said second read counter is the same as said first read counter and said second write counter is different from said first write counter or (ii) said second write counter is the same as said first write counter and said second read counter is different from said first read counter.

15. The circuit in claim 14 wherein said first, second and third decoders each further comprise:
    a first logic circuit configured to (i) receive said read counter and said write counter as a multi-bit signal and (ii) generate a first processed signal, said first logic circuit does not receive a least significant bit (LSB) of said read and write counters;
    a second logic circuit configured to receive said LSB of said read counter and said write counter, said second logic circuit generating a second processed signal; and
    a first gate circuit configured to receive said first and second processed signals from said first and second logic circuits, said first gate circuit generating a single-bit signal representing said first decoded signal.

16. The circuit according to claim 15 wherein each of said first gate circuits further comprises:
    a plurality of NAND gates each generating an output and each receiving one or more of said bits of said first processed signal, one of said plurality of NAND gates receives said LSB signal; and
    a second gate circuit configured to receive each of said outputs from said plurality of NAND gates, said second gate circuit generating said first decoded signal.

17. The circuit according to claim 16 wherein said first and second decoded signals are used to generate one or more status flags.

18. The circuit according to claim 14 wherein said first, second and third decoded signals are used in a memory comprising a FIFO buffer.

19. The circuit according to claim 16 wherein said first and second decoded signals are generated without glitches prior to settling into a steady state.

20. A method for decoding read and write signals used in a memory comprising the steps of:

inputting a first read counter and a first write counter to a first decoder and generating a first decoded signal in response thereto;

inputting a second read counter and a second write counter to a second decoder and generating a second decoded signal in response thereto; and generating one or more status flags in response to said first and second decoded signals wherein (i) said second read counter is the same as said first read counter and said second write counter is different from said first write counter or (ii) said second write counter is the same as said first write counter and said second read counter is different from said first read counter.

21. The method according to claim 20 wherein the step of generating said one or more status flags occurs in further response to meeting certain predefined criteria.

22. The method according to claim 20 wherein the steps of generating said first and second decoded signals are conducted without generating glitches prior to settling into a steady state.

23. The method according to claim 20 wherein the steps of generating said first and second decoded signals are conducted without generating any significant additional delays.

* * * * *